United States Patent

Hagarty

[11] Patent Number: 6,103,972
[45] Date of Patent: Aug. 15, 2000

[54] JUNCTION BOX AND ASSEMBLY

[75] Inventor: Robert J. Hagarty, Spokane, Wash.

[73] Assignee: Randl Industries, Inc., Spokane, Wash.

[21] Appl. No.: 09/080,887

[22] Filed: May 18, 1998

[51] Int. Cl.$^7$ .................................................. H01H 9/02
[52] U.S. Cl. ................................ 174/53; 174/58; 220/3.2; 340/287; 361/600
[58] Field of Search ........................ 174/53, 17 R, 174/50, 51, 52.1, 52.4, 58; 220/3.2, 4.02; 340/286.5, 287, 297; 361/600, 627, 641, 642, 643, 644, 645

[56] References Cited

U.S. PATENT DOCUMENTS

| | | |
|---|---|---|
| Re. 32,762 | 10/1988 | Katzmann et al. . |
| Re. 35,075 | 10/1995 | Lammens, Jr. . |
| 1,805,003 | 5/1931 | Newman . |
| 2,154,310 | 4/1939 | Kinnard . |
| 2,663,454 | 12/1953 | Olson . |
| 2,782,954 | 2/1957 | Antonucci .............................. 220/3.92 |
| 2,850,916 | 9/1958 | Kingdon . |
| 3,333,501 | 8/1967 | Pitcher . |
| 3,587,906 | 6/1971 | Pepe . |
| 3,877,601 | 4/1975 | Evans et al. . |
| 4,063,110 | 12/1977 | Glick ........................................ 307/112 |
| 4,223,796 | 9/1980 | Silver . |
| 4,263,472 | 4/1981 | Maheu ....................................... 174/51 |
| 4,613,728 | 9/1986 | Lathrop . |
| 4,634,015 | 1/1987 | Taylor . |
| 4,640,433 | 2/1987 | Jorgensen et al. . |
| 4,715,507 | 12/1987 | Chamberlin . |
| 4,724,281 | 2/1988 | Nix et al. .................................. 174/53 |
| 4,874,904 | 10/1989 | DeSanti ..................................... 174/53 |
| 4,927,039 | 5/1990 | McNab ..................................... 220/3.7 |
| 4,952,754 | 8/1990 | Rye ........................................... 174/53 |
| 5,012,043 | 4/1991 | Seymour .................................. 174/57 |
| 5,189,259 | 2/1993 | Carson et al. . |
| 5,525,754 | 6/1996 | Akins . |
| 5,663,525 | 9/1997 | Newman .................................. 174/50 |

*Primary Examiner*—Kristine Kincaid
*Assistant Examiner*—Dhiru R Patel
*Attorney, Agent, or Firm*—Christensen O'Connor Johnson & Kindness PLLC

[57] ABSTRACT

An electrical junction box assembly for mounting a fire alarm signaling unit or the like. The box includes a substantially square rear panel, four generally rectangular sidewall panels extending forwardly therefrom, and an open forward end adapted to receive at least a portion of a signaling unit or the like. Each side of the substantially square rear panel is approximately five inches in length, and the sidewall panels extend forwardly from the rear panel approximately two and seven-eighths inches, whereby the box will fit within the three and one-half inch stud space between a wall and a bar hanger typically provided, and yet accommodate the speaker or chime portion of an alarm signaling unit as well as electrical conductors for powering the unit and other devices down the line. An adaptor is provided as an interface connection between the junction box and a fire alarm signaling unit or the like. The adaptor includes a substantially square peripheral flange, each side of which is approximately five inches in length. The adaptor further includes a substantially square peripheral wall extending forwardly from the peripheral flange; each side being approximately four inches in length. Means are provided on the flange of the adaptor for mounting the adaptor to the open forward end of the junction box and to a fire alarm signaling device or the like. The rear wall of the junction box has two openings therein for receiving a grounding screw. The grounding screw openings are spaced from one another laterally and longitudinally so as to ensure that at least one of said openings will not lie against a bar hanger on which the junction box may be mounted.

2 Claims, 3 Drawing Sheets

JUNCTION BOX AND ASSEMBLY

FIELD OF THE INVENTION

The present invention relates generally to electrical junction boxes, and more particularly to electrical junction boxes for mounting fire alarm signaling units of the type which include speakers or chimes, with or without strobe lights, for signaling an alarm condition. These units are sometimes referred to as speaker-strobes or chime-strobes.

BACKGROUND OF THE INVENTION

Prior to the advent of the present invention, conventional metal electrical junction boxes have been four inches square (i.e., four inches on a side) and two and one-eighth inches deep. In approximately 1978, fire alarm signaling devices of the type including both a strobe light and either an audio speaker or chimes, sometimes called a speaker-strobe or chime-strobe, were introduced; and the four inch by four inch by two and one-eighth inch deep boxes were inadequate in size to accommodate the unit and the electrical conductors necessary to power the unit. Accordingly, the industry began to use an extended version of the box, as shown in FIG. 1. That extended version includes a conventional four inch by four inch by two and one-eighth inch deep junction box 1 having a four inch by four inch by one and one-half inch extension 2 connected thereto via screws 3. The forward end of the extension 2 is provided with flanges 4 for mounting the alarm signaling unit thereto. However, this extended four inch square combination unit has proved to be inadequate, for several reasons. First, the space inside the extended junction box is inadequate, considering the necessity of containing both alarm signaling unit and various electrical conductors that must be accommodated in the box for powering the particular alarm signaling unit and other components in the system in which the alarm signaling unit is installed (e.g., other alarm signaling units and/or other electrical devices down the line). The extension unit cannot be made any deeper than one and one-half inches because the combined depth of the two and one-quarter inch deep (outside dimension) four square junction box and a one and one-half inch deep extension is the maximum that will fit in the three and one-half inch conventional stud space when mounted on a bar hanger. In fact, that combined depth of three and three-quarters inches causes a small but undesirable bow on the back side of the wall when mounted on a bar hanger. Furthermore, as shown in FIG. 1, the ridge, designated 5 in FIG. 1, which is necessary to join the box 1 and the extension 2, interferes with the conductors and terminal strip of the device as they are installed in the box.

Accordingly, it is an object of the present invention to provide an electrical junction box which will conveniently mount an alarm signaling unit and fit in the three and one-half inch stud space between a wall and a bar hanger, and yet which will provide adequate space to accommodate the speaker portion of an alarm signaling unit as well as electrical conductors for powering the unit and other devices down the line.

Another object of the present invention is to provide an electrical junction box assembly which will fit between a wall and a bar hanger, with means for mounting a grounding screw in such a way to ensure that the grounding screw will not abut the bar hanger.

SUMMARY OF THE INVENTION

The foregoing and other objects of the present invention have been realized by providing an electrical junction box assembly including a box which is five inches square (i.e., five inches on each side), and two and seven-eighths inches deep, with two holes in the rear panel thereof, each designed to receive a grounding screw and spaced from one another to ensure that at least one of the holes will not abut a bar hanger, and an adaptor for interfacing the box and a conventional speaker-strobe or chime-strobe unit.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
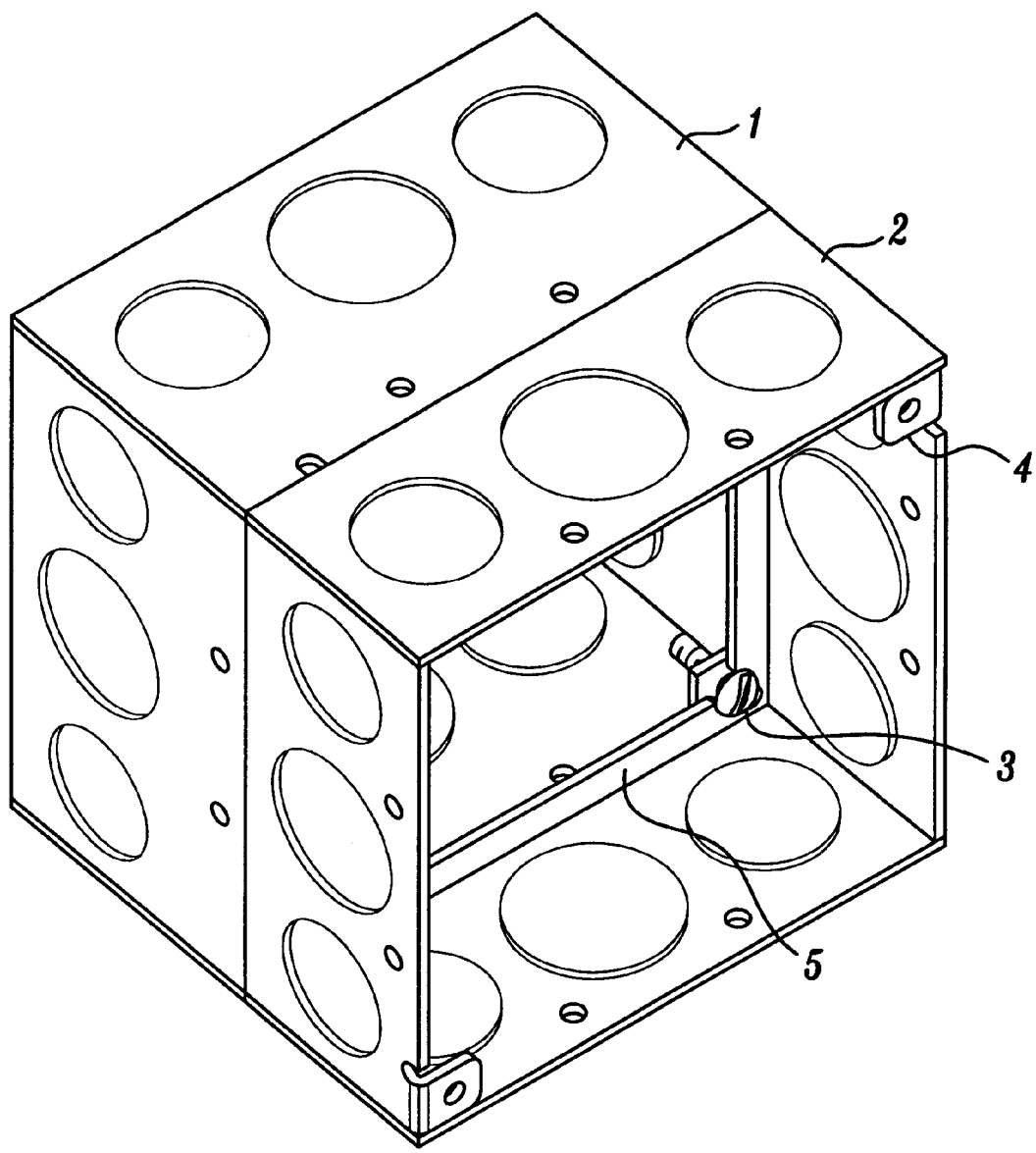
FIG. 1 is a perspective view of a prior art extended electrical junction box exemplary of the boxes described above in the Background of the Invention, i.e., subject to the problems which the present invention was designed to overcome.
Figure 2:
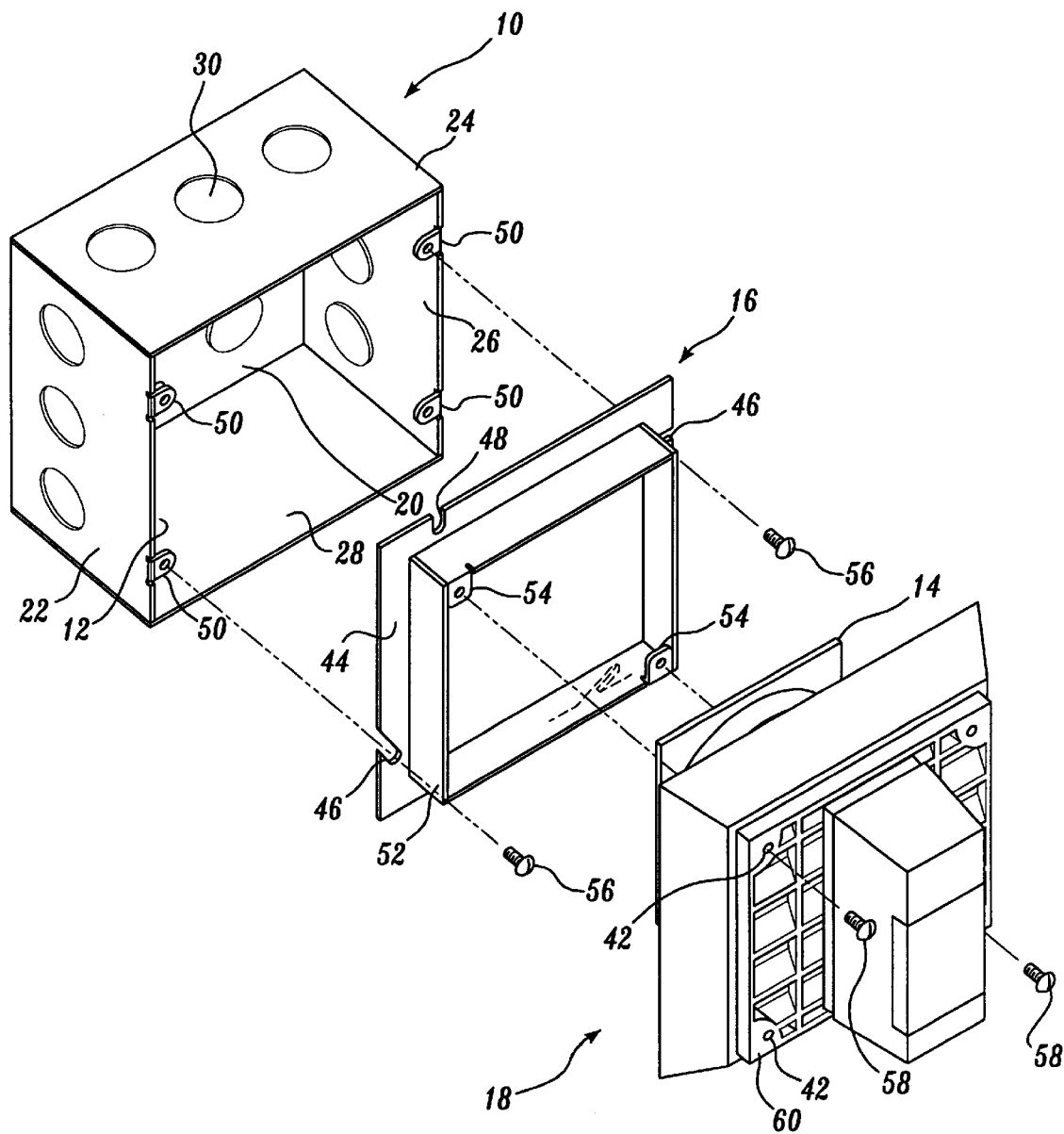
FIG. 2 is an exploded, perspective view of a preferred embodiment of the electrical junction box assembly of the present invention, including an adaptor constructed in accordance with the present invention, in combination with a conventional fire alarm speaker-strobe which the present invention is designed to mount.
Figure 3:
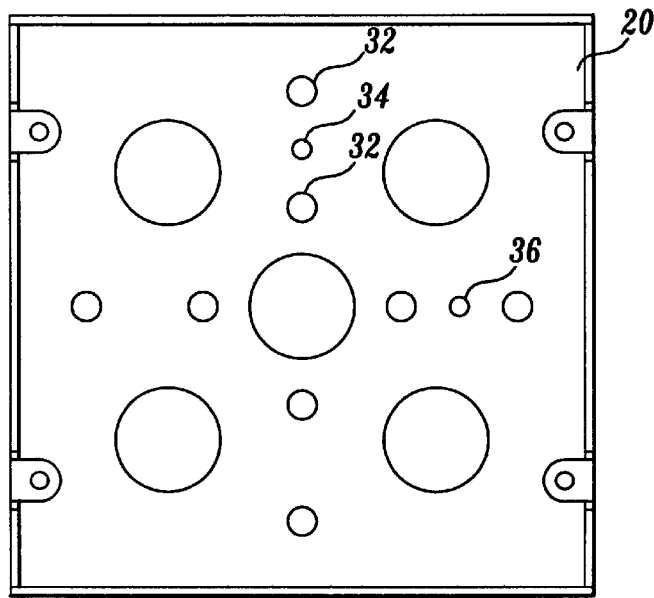
FIG. 3 is a plan view of the rear panel of the electrical junction box illustrated in FIG. 2.

One of the preferred embodiments of the junction box assembly of the present invention is illustrated in FIGS. 2 and 3. The improved assembly includes an improved junction box 10 having a cavity 12 which is designed to receive the speaker portion 14 of an alarm signaling unit, such as a speaker-strobe unit 18 (manufactured by Wheelock, Inc. of Long Branch, N.J.), for example, and an adaptor 16.

The improved junction box 10 comprises a rear panel 20 and four forwardly-extending sidewall panels 22, 24, 26 and 28 which define the cavity 12. In order to accommodate both the speaker portion 14 of the speaker-strobe unit 18 and various electrical wires and still fit within the space typically provided between the wall (e.g., sheetrock) and interior bar hanger on which the assembly will typically be mounted, the improved junction box 10 measures approximately five inches square and two and seven-eighths inches deep.

The rear wall 20 of the junction box 10 includes a number of conventional knock-outs 30, as do the sidewalls, 22, 24, 26 and 28, for receiving the ends of conductor-carrying conduits (not shown) and/or connectors (not shown) therefore. As shown in FIG. 3, the rear panel 20 of the junction box 10 also includes a plurality of mounting holes 32 for accommodating screws to mount the junction box 10 on a bar hanger or other structure (not shown). In addition, the rear panel 20 also includes at least two holes 34, 36, each adapted to receive a grounding screw (not shown). While only one grounding screw may be required, two holes 34, 36 are provided and spaced so as to ensure that the grounding screw will not abut a bar hanger which would preclude easy tightening of the grounding screw. Thus, as shown in FIG. 3, grounding screw hole 36 is spaced at least three-quarters of an inch from grounding screw hole 34, both laterally (i.e., at least three-quarters of an inch to the right, as shown in FIG. 3) and longitudinally (i.e., at least three-quarters of an inch below, as shown in FIG. 3). The provision of two grounding screw holes 34, 36, spaced apart in the manner illustrated in FIG. 3 precludes the possibility that both holes will align with a bar hanger.

Referring to FIG. 2, the adaptor 16 provides an interface connection between the approximately five inch square junction box 10 and the mounting screw holes 42 provided in the conventional speaker-strobe unit 18, which holes 42 are spaced to form an approximately four inch square mounting pattern. The adaptor 16, includes a substantially square peripheral flange 44, each side of which is approximately five inches in length and one-half an inch wide, so as to define an approximately four inch square opening for receiving the speaker portion 14 of the signaling unit 18. Screw slots 46, 48 are provided in the flange 44 and are positioned so that at least two of the slots will align with screw holes in two of four mounting brackets 50 provided around the periphery of the front edge of the junction box 10. An approximately four inch square flange or wall 52 extends forwardly approximately five-eighths of an inch from the flange 44; and mounting brackets 54 are provided in two diametrically opposite corners so as to align with two diametrically-opposed screw holes 42 in the conventional speaker-strobe unit 18.

To assemble the improved junction box assembly illustrated in FIGS. 2 and 3, the adaptor 16 is first mounted on the junction box 10 via screws 56, 56 which extend through slots 48, 48 or 46, 46 in the flange 44 of the adaptor and through the holes in the aligned flanges 50, 50 on the front five inch square peripheral edge of the junction box 10. Thereafter, the speaker-strobe unit 18 is mounted to the adaptor via screws 58, 58 extending through diametrically-opposed mounting holes 42, 42 in the grill panel 60 of the speaker-strobe unit 18 and into the aligned holes of diametrically-opposed, aligned mounting flanges 54, 54 of the adaptor, with the speaker 14 extending into the cavity 12 in the junction box. As so assembled, the enlarged area in the cavity 12 of the junction box 10 will accommodate the speaker 14 and a relatively large number of conductors, some of which will attach to speaker 14, and others of which will then pass through the box and on to the next speaker-strobe unit (or other electrical device) down the line, therefore avoiding the need for multiple junction boxes.

Figure 4:
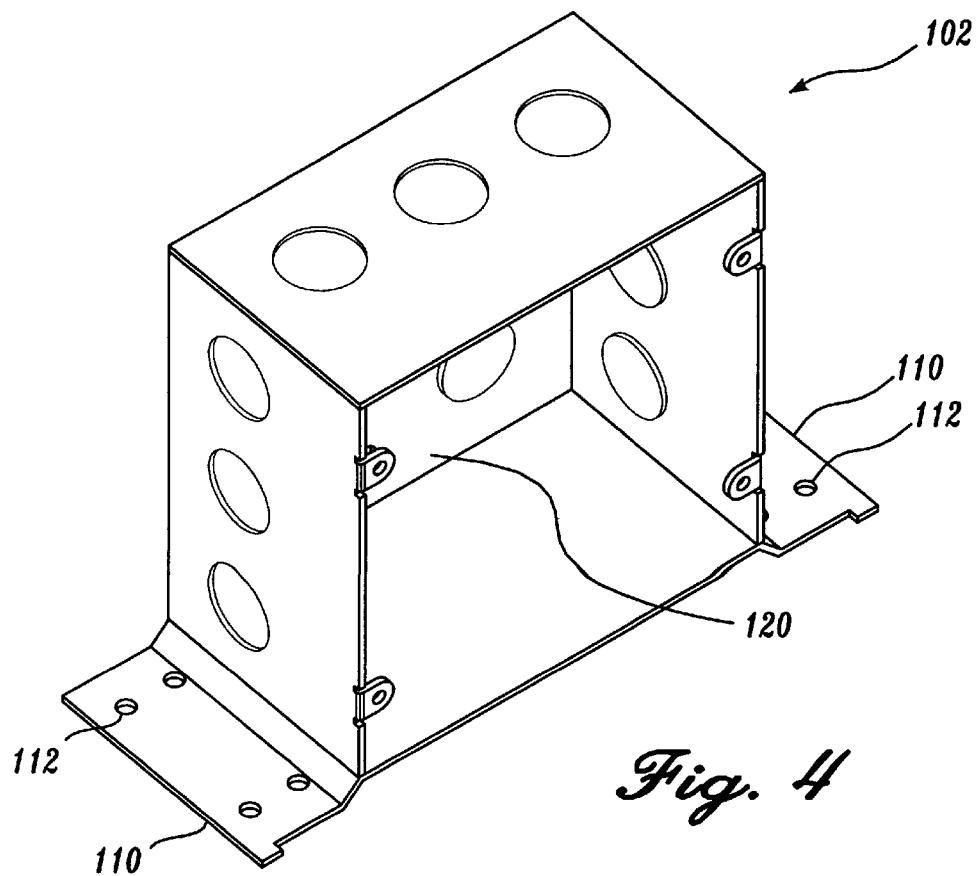
FIG. 4 is a perspective view of an alternative preferred embodiment of the electrical junction box of the present invention.

FIG. 4 illustrates an alternative, preferred embodiment of an improved junction box 108 constructed in accordance with the present invention, wherein a pair of mounting brackets 110, 110 are provided along with screw holes, 112, 112 to facilitate mounting the junction box on a stud or the like. In all other respects, the junction box shown in FIG. 4 is identical to the junction box 10 illustrated in FIGS. 2 and 3. The rear panel 120 of the junction box 108, however, need not have mounting holes corresponding to the mounting holes 32 of the rear panel 20 shown in FIG. 3. Alternatively, such holes may be provided to standardize the manufacturing of both boxes by the same facilities and procedures.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In combination:

an electrical junction box comprising a substantially square rear panel, four generally rectangular sidewall panels extending forwardly from said rear panel, each of said generally rectangular sidewall panels forming substantially a right angle with said rear panel, and an open forward end;

each side of said substantially square rear panel being approximately five inches in length; each of said generally rectangular sidewall panels being approximately five inches in length;

an adaptor including a substantially square peripheral flange; each side of said peripheral flange being approximately five inches in length and approximately one-half an inch wide, so as to define an approximately four inch square opening;

a fire alarm signaling unit having a portion thereof extending through said opening in said adaptor and said open forward end of said junction box;

first means on said adaptor for securing said adaptor to said forward end of said junction box; and second means on said adaptor for securing said adaptor to said fire alarm signaling unit;

whereby said adaptor provides an interface connection between said junction box and said fire alarm signaling unit.

2. The combination of claim 1, wherein said rear panel of said junction box has at least two openings therein, each adapted to receive a grounding screw; said grounding screw openings being spaced from one another laterally and longitudinally so as to ensure that at least one of said openings will not be obstructed by a structure on which said junction box is to be mounted.

* * * * *

UNITED STATES PATENT AND TRADEMARK OFFICE
CERTIFICATE OF CORRECTION

PATENT NO. : 6,103,972
DATED : August 15, 2000
INVENTOR(S) : R.J. Hagarty

It is certified that error appears in the above-identified patent and that said Letters Patent is hereby corrected as shown below:

Column 4,
Line 23 (Claim 1, line 9), the phrase beginning "each of said generally" should begin a new subparagraph Signed and Sealed this Sixteenth Day of October, 2001

Attest:

*Attesting Officer*

NICHOLAS P. GODICI
*Acting Director of the United States Patent and Trademark Office*